(No Model.)

E. E. POOLE.
NUT LOCK.

No. 504,999.   Patented Sept. 12, 1893.

WITNESSES:
Fred G. Dieterich
P. B. Turpin.

INVENTOR:
Edward E. Poole
BY
ATTORNEYS

UNITED STATES PATENT OFFICE.

EDWARD ELIJAH POOLE, OF FORDYCE, ARKANSAS.

NUT-LOCK.

SPECIFICATION forming part of Letters Patent No. 504,999, dated September 12, 1893.

Application filed April 14, 1893. Serial No. 470,321. (No model.)

*To all whom it may concern:*

Be it known that I, EDWARD ELIJAH POOLE, of Fordyce, in the county of Dallas and State of Arkansas, have invented a new and useful Improvement in Nut-Locks, of which the following is a specification.

My invention is an improvement in nut locks and seeks to provide a simple, novel and efficient combined washer and spring.

The invention consists in the novel construction, combination and arrangement of parts as will be hereinafter described and pointed out in the claims.

Figure 1:
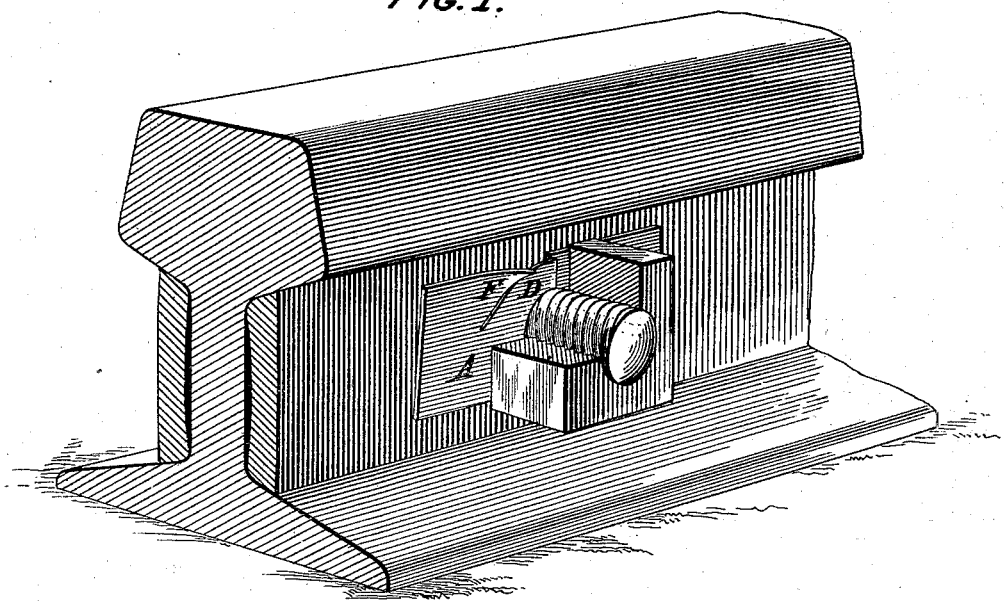
Figure 2:
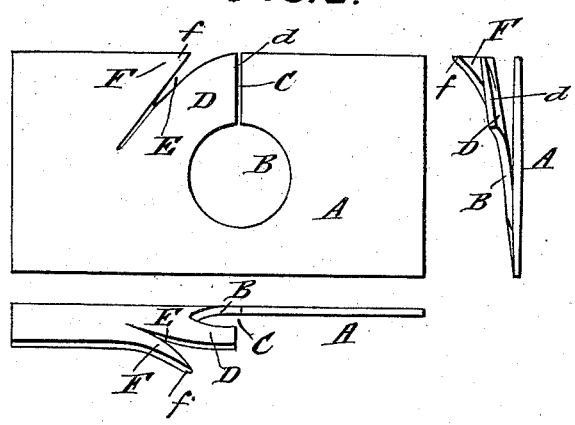

In the drawings—Figure 1 is a perspective view of my improvement as in use parts of the nut being broken away, and Fig. 2 shows the locking plate in detail.

The locking plate A has a bolt hole B and a slit C leading outward from the said hole to the edge of the plate, forming a tongue D which is sprung outward from the plane of the plate, forming a spring tongue which normally springs outward from the plate but may be compressed by the nut turned against the plate. The point of this tongue is the line of the slit C and a slight distance in rear of this slit C the plate is slitted at E in a direction diagonal to the slit C, forming a sharp point $f$ at the end of the pawl F formed by the slit E, and bent forward and projecting at its point $f$ beyond the point of the tongue D.

It will be seen that the forward bending of the tongue D brings the radial edge of its point at an angle to the plane of the plate A, producing a point like portion at $d$ for engagement by the inner end of the nut.

In practice it will be seen the plate is slipped on the bolt in advance of the nut, and the latter turned up against it will turn on past the pawl and tongue, and when turned home will be held by said parts from jarring loose and coming off.

The forwardly bent spring tongue D in practice forms a spring support for the pawl F and increases the tension of said pawl by increasing the deflected portion of the plate from which portion the pawl secures additional tension.

It should be understood that in practice the tongue D engages the back or base of the nut while the pawl F springs up alongside the same and positively locks it from turning loose.

Having thus described my invention, what I claim as new, and desire to secure by Letters Patent, is—

1. The improved nut lock herein described consisting of the plate A having the bolt hole B and provided with the slits C and E, forming tongue D and pawl F, the slit C extending from the edge to the bolt hole and the slit E being formed diagonally to the edge of plate A whereby to produce a point at the end of the pawl F, and both the pawl and the tongue being bent forward at their free ends or points substantially as set forth.

2. The improved nut locking plate herein described having a bolt opening, a slit C leading from said opening to the edge of the plate and forming a tongue D and provided adjacent to said tongue with another slit forming a spring pawl F the said pawl and tongue being both deflected to the same side of the plane of the plate and being arranged to both point and face in the same direction with respect to the revolution of the nut all substantially as set forth.

EDWARD ELIJAH POOLE.

Witnesses:
   W. B. JONES, Jr.,
   GEO. B. DRISKELL.